(12) United States Patent
Sinha

(10) Patent No.: US 7,971,251 B2
(45) Date of Patent: Jun. 28, 2011

(54) SYSTEMS AND METHODS FOR WIRELESS SECURITY USING DISTRIBUTED COLLABORATION OF WIRELESS CLIENTS

(75) Inventor: Amit Sinha, Marlborough, MA (US)

(73) Assignee: AirDefense, Inc., Alpharetta, GA (US)

(*) Notice: Subject to any disclaimer, the term of this patent is extended or adjusted under 35 U.S.C. 154(b) by 1020 days.

(21) Appl. No.: 11/276,925

(22) Filed: Mar. 17, 2006

(65) Prior Publication Data

US 2007/0217371 A1    Sep. 20, 2007

(51) Int. Cl.
*H04W 12/08* (2009.01)
*H04W 48/00* (2009.01)

(52) U.S. Cl. .......... 726/23; 455/423; 455/410; 455/411; 455/421

(58) Field of Classification Search .................. 726/23; 455/423, 410, 411, 421; 370/388
See application file for complete search history.

(56) References Cited

U.S. PATENT DOCUMENTS

| | | | |
|---|---|---|---|
| 5,077,753 A | 12/1991 | Grau, Jr. et al. | |
| 5,231,634 A | 7/1993 | Giles et al. | |
| 5,237,614 A | 8/1993 | Weiss | |
| 5,339,316 A | 8/1994 | Diepstraten | |
| 5,393,965 A | 2/1995 | Bravman et al. | |
| 5,487,069 A | 1/1996 | O'Sullivan et al. | |
| 5,577,209 A | 11/1996 | Boyle et al. | |
| 5,646,389 A | 7/1997 | Bravman et al. | |
| 5,666,662 A | 9/1997 | Shibuya | |
| 5,737,328 A | 4/1998 | Norman et al. | |
| 5,745,479 A | 4/1998 | Burns et al. | |
| 5,745,483 A | 4/1998 | Nakagawa et al. | |
| 5,768,312 A | 6/1998 | Imamura | |
| 5,781,857 A | 7/1998 | Hwang et al. | |
| 5,787,077 A | 7/1998 | Kuehnel et al. | |
| 5,796,942 A | 8/1998 | Esbensen | |
| 5,809,060 A | 9/1998 | Cafarella et al. | |
| 5,825,817 A | 10/1998 | Tanaka et al. | |
| 5,844,900 A | 12/1998 | Hong et al. | |
| 5,866,888 A | 2/1999 | Bravman et al. | |
| 5,870,666 A | 2/1999 | Tanaka et al. | |
| 5,875,179 A | 2/1999 | Tikalsky | |
| 5,896,499 A | 4/1999 | McKelvey | |
| 5,903,848 A | 5/1999 | Takahashi | |
| 5,913,174 A | 6/1999 | Casarez et al. | |
| 5,919,258 A | 7/1999 | Kayashima et al. | |
| 5,940,591 A | 8/1999 | Boyle et al. | |

(Continued)

FOREIGN PATENT DOCUMENTS

WO    WO 98/59428    12/1998

(Continued)

OTHER PUBLICATIONS

Spitzner, Lance. "Honeypots:Definitions and Value of Honeypots." Tracking-Hackers. May 29, 2003. <http://www.tracking-hackers.com/papers/honeypots.html>.*

(Continued)

*Primary Examiner* — Kambiz Zand
*Assistant Examiner* — Imhotep Durham
(74) *Attorney, Agent, or Firm* — Clements Bernard PLLC; Lawrence A. Baratta, Jr.; Christopher L. Bernard

(57) ABSTRACT

Systems and methods for distributed monitoring of a wireless network using a plurality of wireless client devices in communication with the wireless network.

26 Claims, 11 Drawing Sheets

U.S. PATENT DOCUMENTS

| | | | |
|---|---|---|---|
| 5,953,652 A | 9/1999 | Amin et al. | |
| 5,987,609 A | 11/1999 | Hasebe | |
| 6,006,090 A | 12/1999 | Coleman et al. | |
| 6,058,482 A | 5/2000 | Liu | |
| 6,067,297 A | 5/2000 | Beach | |
| 6,070,244 A | 5/2000 | Orchier et al. | |
| 6,104,712 A | 8/2000 | Robert et al. | |
| 6,119,230 A | 9/2000 | Carter | |
| 6,141,778 A | 10/2000 | Kane et al. | |
| 6,145,083 A | 11/2000 | Shaffer et al. | |
| 6,150,961 A * | 11/2000 | Alewine et al. | 340/995.1 |
| 6,151,357 A | 11/2000 | Jawahar et al. | |
| 6,158,010 A | 12/2000 | Moriconi et al. | |
| 6,178,512 B1 | 1/2001 | Fifield | |
| 6,185,689 B1 | 2/2001 | Todd, Sr. et al. | |
| 6,188,681 B1 | 2/2001 | Vesuna | |
| 6,202,157 B1 | 3/2001 | Brownlie et al. | |
| 6,272,129 B1 | 8/2001 | Dynarski et al. | |
| 6,272,172 B1 | 8/2001 | Deshpande et al. | |
| 6,282,546 B1 | 8/2001 | Gleichauf et al. | |
| 6,289,214 B1 | 9/2001 | Backstrom | |
| 6,292,508 B1 | 9/2001 | Hong et al. | |
| 6,301,668 B1 | 10/2001 | Gleichauf et al. | |
| 6,301,699 B1 | 10/2001 | Hollander et al. | |
| 6,304,973 B1 | 10/2001 | Williams | |
| 6,317,829 B1 | 11/2001 | Van Oorschot | |
| 6,320,948 B1 | 11/2001 | Heilmann et al. | |
| 6,324,647 B1 | 11/2001 | Bowman-Amuah | |
| 6,324,656 B1 | 11/2001 | Gleichauf et al. | |
| 6,330,244 B1 | 12/2001 | Swartz et al. | |
| 6,363,477 B1 | 3/2002 | Fletcher et al. | |
| 6,400,752 B1 | 6/2002 | Suzuki et al. | |
| 6,404,772 B1 | 6/2002 | Beach et al. | |
| 6,411,608 B2 | 6/2002 | Sharony | |
| 6,453,159 B1 | 9/2002 | Lewis | |
| 6,453,345 B2 | 9/2002 | Trcka et al. | |
| 6,466,608 B1 | 10/2002 | Hong et al. | |
| 6,470,384 B1 | 10/2002 | O'Brien et al. | |
| 6,473,449 B1 | 10/2002 | Cafarella et al. | |
| 6,477,198 B1 | 11/2002 | Gumm | |
| 6,484,029 B2 | 11/2002 | Hughes et al. | |
| 6,487,666 B1 | 11/2002 | Shanklin et al. | |
| 6,499,107 B1 | 12/2002 | Gleichauf et al. | |
| 6,501,951 B2 | 12/2002 | Moore | |
| 6,507,864 B1 | 1/2003 | Klein et al. | |
| 6,522,689 B1 | 2/2003 | Heinrich | |
| 6,539,207 B1 | 3/2003 | del Castillo et al. | |
| 6,539,428 B2 | 3/2003 | Davies | |
| 6,674,403 B2 | 1/2004 | Gray et al. | |
| 6,697,337 B1 | 2/2004 | Cafarelli et al. | |
| 6,738,813 B1 * | 5/2004 | Reichman | 709/224 |
| 6,799,047 B1 | 9/2004 | Bahl et al. | |
| 6,874,089 B2 | 3/2005 | Dick et al. | |
| 6,910,135 B1 | 6/2005 | Grainger | |
| 6,934,298 B2 | 8/2005 | Bentley | |
| 6,988,208 B2 * | 1/2006 | Hrabik et al. | 726/23 |
| 7,089,303 B2 * | 8/2006 | Sheymov et al. | 709/224 |
| 7,366,148 B2 * | 4/2008 | Muaddi et al. | 370/338 |
| 7,594,267 B2 * | 9/2009 | Gladstone et al. | 726/23 |
| 2001/0027107 A1 | 10/2001 | Shinozaki et al. | |
| 2001/0030956 A1 | 10/2001 | Chillariga et al. | |
| 2001/0038626 A1 | 11/2001 | Dynarski et al. | |
| 2001/0039579 A1 | 11/2001 | Trcka et al. | |
| 2002/0021745 A1 | 2/2002 | Negus | |
| 2002/0029288 A1 | 3/2002 | Dobbins et al. | |
| 2002/0032871 A1 | 3/2002 | Malan et al. | |
| 2002/0035699 A1 | 3/2002 | Crosbie | |
| 2002/0044533 A1 | 4/2002 | Bahl et al. | |
| 2002/0059434 A1 | 5/2002 | Karaoguz et al. | |
| 2002/0060994 A1 | 5/2002 | Kovacs et al. | |
| 2002/0060995 A1 | 5/2002 | Cervello et al. | |
| 2002/0061031 A1 | 5/2002 | Sugar et al. | |
| 2002/0066034 A1 | 5/2002 | Schlossberg et al. | |
| 2002/0072329 A1 | 6/2002 | Bandeira et al. | |
| 2002/0083343 A1 | 6/2002 | Crosbie et al. | |
| 2002/0087882 A1 | 7/2002 | Schneier et al. | |
| 2002/0090089 A1 | 7/2002 | Branigan et al. | |
| 2002/0090952 A1 | 7/2002 | Cantwell | |
| 2002/0094777 A1 | 7/2002 | Cannon et al. | |
| 2002/0101837 A1 | 8/2002 | Bender et al. | |
| 2002/0112047 A1 | 8/2002 | Kushwaha et al. | |
| 2002/0112185 A1 | 8/2002 | Hodges | |
| 2002/0129138 A1 | 9/2002 | Carter | |
| 2002/0138755 A1 | 9/2002 | Ko | |
| 2002/0147920 A1 | 10/2002 | Mauro | |
| 2002/0160769 A1 | 10/2002 | Gray | |
| 2002/0161755 A1 | 10/2002 | Moriarty | |
| 2002/0174364 A1 | 11/2002 | Nordman et al. | |
| 2002/0176437 A1 | 11/2002 | Busch et al. | |
| 2002/0178383 A1 | 11/2002 | Hrabik et al. | |
| 2002/0181417 A1 | 12/2002 | Malhotra et al. | |
| 2003/0009696 A1 | 1/2003 | Bunker et al. | |
| 2003/0021254 A1 | 1/2003 | Fukuda | |
| 2003/0026198 A1 | 2/2003 | Diepstraten et al. | |
| 2003/0027550 A1 | 2/2003 | Rockwell | |
| 2003/0036404 A1 | 2/2003 | Adachi et al. | |
| 2003/0048770 A1 | 3/2003 | Proctor, Jr. | |
| 2003/0060207 A1 | 3/2003 | Sugaya et al. | |
| 2003/0061344 A1 | 3/2003 | Monroe | |
| 2003/0061506 A1 | 3/2003 | Cooper et al. | |
| 2003/0063592 A1 | 4/2003 | Seki et al. | |
| 2003/0064720 A1 | 4/2003 | Valins et al. | |
| 2003/0065934 A1 | 4/2003 | Angelo et al. | |
| 2003/0070084 A1 | 4/2003 | Satomaa et al. | |
| 2003/0084323 A1 | 5/2003 | Gales | |
| 2003/0088789 A1 | 5/2003 | Fenton et al. | |
| 2003/0095520 A1 | 5/2003 | Aalbers et al. | |
| 2003/0096577 A1 | 5/2003 | Heinonen et al. | |
| 2003/0096607 A1 | 5/2003 | Taylor | |
| 2003/0100308 A1 | 5/2003 | Rusch | |
| 2003/0105976 A1 | 6/2003 | Copeland, III | |
| 2003/0108016 A1 | 6/2003 | Bonta | |
| 2003/0110398 A1 | 6/2003 | Dacier et al. | |
| 2003/0117966 A1 | 6/2003 | Chen | |
| 2003/0117985 A1 | 6/2003 | Fujii et al. | |
| 2003/0117986 A1 | 6/2003 | Thermond et al. | |
| 2003/0119526 A1 | 6/2003 | Edge | |
| 2003/0120821 A1 | 6/2003 | Thermond et al. | |
| 2003/0123420 A1 | 7/2003 | Sherlock | |
| 2003/0125035 A1 | 7/2003 | Khafizov et al. | |
| 2003/0126258 A1 | 7/2003 | Conkright et al. | |
| 2003/0135762 A1 | 7/2003 | Macaulay | |
| 2003/0140246 A1 | 7/2003 | Kammer et al. | |
| 2003/0149888 A1 | 8/2003 | Yadav | |
| 2003/0161341 A1 | 8/2003 | Wu et al. | |
| 2003/0174680 A1 | 9/2003 | Kuan et al. | |
| 2003/0185244 A1 | 10/2003 | Wu et al. | |
| 2003/0188189 A1 * | 10/2003 | Desai et al. | 713/201 |
| 2003/0189908 A1 | 10/2003 | Kuan et al. | |
| 2003/0192055 A1 | 10/2003 | Aoki et al. | |
| 2003/0196115 A1 | 10/2003 | Karp | |
| 2003/0200455 A1 | 10/2003 | Wu | |
| 2003/0217289 A1 | 11/2003 | Ammon et al. | |
| 2003/0221006 A1 | 11/2003 | Kuan et al. | |
| 2003/0224797 A1 | 12/2003 | Kuan et al. | |
| 2004/0003285 A1 | 1/2004 | Whelan et al. | |
| 2004/0027988 A1 * | 2/2004 | Billhartz | 370/229 |
| 2004/0068668 A1 | 4/2004 | Lor et al. | |
| 2004/0078598 A1 | 4/2004 | Barber et al. | |
| 2004/0102192 A1 | 5/2004 | Serceki | |
| 2004/0103307 A1 | 5/2004 | Raphaeli et al. | |
| 2004/0107219 A1 | 6/2004 | Rosenberger | |
| 2004/0136318 A1 | 7/2004 | Bentley | |
| 2004/0162995 A1 | 8/2004 | Muaddi et al. | |
| 2005/0030929 A1 * | 2/2005 | Swier et al. | 370/338 |
| 2005/0037733 A1 * | 2/2005 | Coleman et al. | 455/411 |
| 2005/0202800 A1 * | 9/2005 | Wang | 455/404.1 |

FOREIGN PATENT DOCUMENTS

| | | |
|---|---|---|
| WO | WO 01/43467 A1 | 6/2001 |
| WO | WO 02/058346 A2 | 7/2002 |
| WO | WO 02/058346 A3 | 7/2002 |
| WO | WO 02/097560 A2 | 12/2002 |
| WO | WO 03/021851 | 3/2003 |
| WO | WO 03/079708 A1 | 9/2003 |
| WO | WO 03/084255 A1 | 10/2003 |

| WO | WO 03/085544 A1 | 10/2003 |
| WO | WO 03/088547 A2 | 10/2003 |
| WO | WO 03/088687 | 10/2003 |

OTHER PUBLICATIONS

Redding, S. "Using Peer-to-Peer Technology for Network Forensics," in Advances in Digital Forensics, Proceedings of the IFIP International Conference on Information Processing, 2005, vol. 194/2005, 141-152.*

*Distributed Wireless Security Auditor*, IBM Research http://www.research.ibm.com/gsal/dwsa/ (Accessed: Apr. 10, 2003).

*IBM Debuts First Self-Diagnostic Wireless Security Tool on Linux*, LWN.net, (Date Alleged: Jun. 17, 2002) http://www.lwn.net/Articles/2661 (Accessed: Apr. 10, 2003).

*IBM extends its Wireless Security Auditor with more autonomic features*, Serverworld: Online News (Date Alleged: Jun. 2002) http://www.serverworldmagazine.com/newsflash2/2002/06/19_ibmdwsa.shtml (Accessed: Apr. 10, 2003).

*IBM initiative addresses wireless security*, M2 PRESWIRE (Date alleged: Oct. 9, 2001) http://www.lexis.com/research (Accessed: Apr. 10, 2003).

*IBM Research's Wireless Security Auditor One-Step Ahead of Hackers*, MOBILEINFO.com, Issue 2001-30 (Date Alleged: Jul. 2001) (Alleged Update: Jul. 25, 2001) http://www.mobileinfo.com/News_2001/Issue30/IBM_Auditor.htm (Accessed from Google's cache: Apr. 10, 2003).

*IBM unlocks wireless security services*, IT world.com (Date Alleged: Oct. 9, 2001) http://www.itworld.com/Net/2629/IDGO11009IBMsecurity (Accessed from Google's cache: Apr. 10, 2003).

Losi, Stephanie, *IBM Steps Up Wireless Security*, NewsFactor Network (Date Alleged: Oct. 8, 2001) http://www.newsfactor.com/perl/story/14012.html (Accessed: Apr. 10, 2003).

Lough, Daniel et al., "A Short Tutorial on Wireless LANs and IEEE 802.11" printed on May 27, 2002 in *The IEEE Computer Society's Student Newsletter*, Summer 1997, vol. 5, No. 2.

Manecksha, Ferina, *IBM to focus on "Think" strategy*, News Straits Times-Management Times (Date Alleged: Jan. 30, 2003) http://www.lexis.com/research (Accessed: Apr. 10, 2003).

Morochove, Richard, *Why Dell lets competitors do the heavy lifting*, Toronto Star (Date Alleged: Nov. 11, 2002) http://www.lexis.com/research (Accessed: Apr. 10, 2003).

Schwartz, Ephraim, *IBM Offers a Peek at Self-Healing PCS: Autonomic computing initiative will lead to self-configuring desktops and notebooks and greater wireless security*. (Date Alleged: Nov. 19, 2002) http://www.pcworld.com/resource/printable/article/0,aid,107069.asp (Accessed from Google's cache: Apr. 10, 2003).

Schwartz, Ephraim, *IBM unveils autonomic computing on notebooks, desktops*, InforWorld Daily News (Dated Alleged: Nov. 19, 2002) http://www.lexis.com/research (Accessed: Apr. 10, 2003).

Toomgum, Sirvish, *"Think" Big Blue, NATION*, WorldSources, Inc. (Date Alleged: Nov. 19, 2002) http://www.lexis.com/research (Accessed: Apr. 10, 2003).

*WhereLAN Location Sensor Locating Access Point*, WhereNet U.S.A. (2002).

*Wireless Security Auditor* (*WSA*), IBM Security Research http://www.research.ibm.com/gsal/wsa/ (Accessed: Apr. 10, 2003).

* cited by examiner

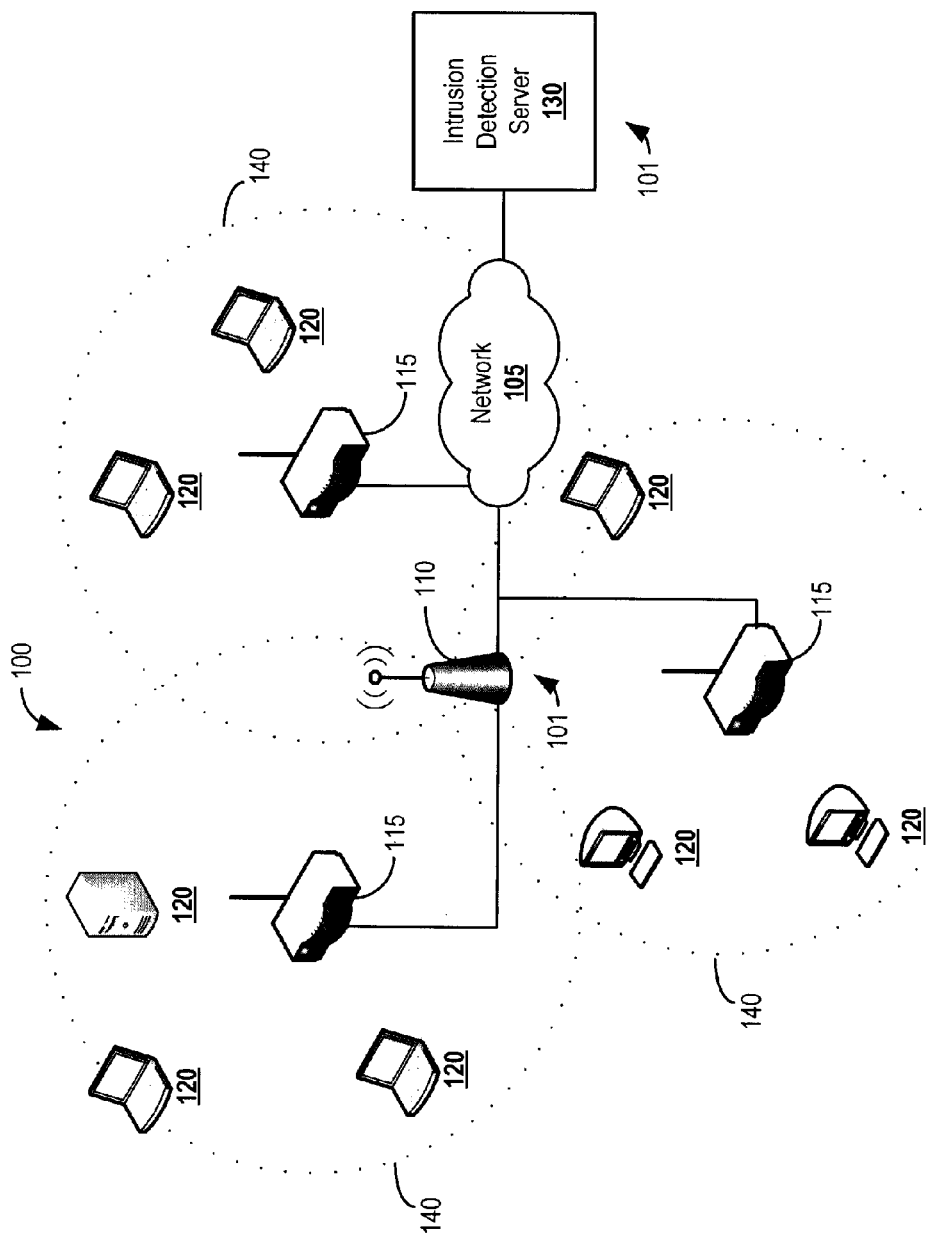

SYSTEMS AND METHODS FOR WIRELESS SECURITY USING DISTRIBUTED COLLABORATION OF WIRELESS CLIENTS

CROSS-REFERENCE TO RELATED PATENT APPLICATIONS

This application further incorporates by this reference in their entirety for all purposes commonly assigned U.S. patent applications filed Jun. 3, 2002:

| Application No. | Title |
| --- | --- |
| 10/161,142 | "SYSTEMS AND METHODS FOR NETWORK SECURITY" |
| 10/161,440 | "SYSTEM AND METHOD FOR WIRELESS LAN DYNAMIC CHANNEL CHANGE WITH HONEYPOT TRAP" |
| 10/161,443 | "METHOD AND SYSTEM FOR ACTIVELY DEFENDING A WIRELESS LAN AGAINST ATTACKS" |
| 10/160,904 | "METHODS AND SYSTEMS FOR IDENTIFYING NODES AND MAPPING THEIR LOCATIONS" |
| 10/161,137 | "METHOD AND SYSTEM FOR ENCRYPTED NETWORK MANAGEMENT AND INTRUSION DETECTION" |

Furthermore, this application incorporates by reference for all purposes, commonly assigned U.S. patent applications filed Nov. 4, 2003:

| Application No. | Title |
| --- | --- |
| 10/700,842 | "SYSTEMS AND METHODS FOR AUTOMATED NETWORK POLICY EXCEPTION DETECTION AND CORRECTION" |
| 10/700,914 | "SYSTEMS AND METHOD FOR DETERMINING WIRELESS NETWORK TOPOLOGY" |
| 10/700,844 | "SYSTEMS AND METHODS FOR ADAPTIVELY SCANNING FOR WIRELESS COMMUNICATIONS" |

Furthermore, this application incorporates by reference for all purposes, commonly assigned U.S. patent applications filed Feb. 6, 2004:

| Application No. | Title |
| --- | --- |
| 10/774,034 | "SYSTEMS AND METHODS FOR ADAPTIVE LOCATION TRACKING" |
| 10/774,111 | "WIRELESS NETWORK SURVEY SYSTEMS AND METHODS" |
| 10/773,896 | "SYSTEMS AND METHODS FOR ADAPTIVE MONITORING WITH BANDWIDTH CONSTRAINTS" |
| 10/773,915 | "DYNAMIC SENSOR DISCOVERY AND SELECTION SYSTEMS AND METHODS" |

Furthermore, this application incorporates by reference for all purposes, commonly assigned U.S. patent application filed Oct. 19, 2005:

| Application No. | Title |
| --- | --- |
| 11/253,316 | "PERSONAL WIRELESS MONITORING AGENT" |

Furthermore, this application incorporates by reference for all purposes, commonly assigned U.S. patent application filed Jan. 13, 2006:

| Application No. | Title |
| --- | --- |
| 11/332,065 | "SYSTEMS AND METHODS FOR WIRELESS INTRUSION DETECTION USING SPECTRAL ANALYSIS" |

Furthermore, this application incorporates by reference for all purposes, commonly assigned U.S. patent application filed Mar. 17, 2006:

| Application No. | Title |
| --- | --- |
| TBD | "SYSTEMS AND METHODS FOR WIRELESS NETWORK FORENSICS" |

BACKGROUND AND SUMMARY

This disclosure relates to wireless network security systems and methods, and more particularly to systems and methods for using the distributed collaborative intelligence of wireless clients to monitor a wireless network.

Wireless networking has proliferated with the adoption of the Institute of Electrical and Electronics Engineers (IEEE) 802.11 family of standards, the availability of license-free spectrum in the 2.4 GHz and 5 GHz bands, and the proliferation of cost-effective wireless networking equipment. The various 802.11 standards developed by the IEEE are available for download via URL: http://standards.ieee.org/getieee802/802.11.html; each of which is hereby incorporated by reference. The Federal Communications Commission (FCC) has designated the 900 MHz, 2.4 GHz, and 5 GHz bands as license-free for Industrial, Scientific, and Medical (ISM) purposes. Wireless networking manufacturers have introduced cost-effective wireless devices which operate over the ISM bands utilizing the 802.11 standards.

Wireless networks, also known as Wireless Local Area Networks (WLANs), offer a quick and effective extension of a wired network or a standard local area network (LAN). Wireless networks can include components such as wireless access points (APs) and wireless client devices. A wireless AP is a device that can connect wireless communications devices together to form a wireless network. The AP may connect to a wired networks, and can relay data between wireless devices and wired devices. Wireless client devices include laptop, desktop computers, and other computing devices equipped with a wireless capability.

It should be understood that wired networks, or LANs, can use cables to transfer information. Cables can be a controlled medium, protected by the buildings that enclose them. External traffic that enters a wired network can be policed by a firewall and established wired intrusion protection technologies. To gain access to a wired network, a hacker could bypass the physical security of the building or breach the firewall.

In contrast, wireless networks transfer information over the air. The air is an uncontrolled and shared medium—it lacks the equivalent physical security of its wired counterpart. This renders the entire network accessible from areas outside of the physical security of building. Radio signals from a single wireless AP can travel thousands of feet outside of the building. Additionally, wireless devices within the network can sniff all the traffic of all other wireless devices within the same basic service set.

Further, wireless devices are easy to deploy, are relatively inexpensive, and are mobile. Many laptops on the market today are wireless ready. Older laptops can get wireless access by adding a wireless network card and installing software. A stand-alone AP and a wireless card can cost under $100 each. Even well-intentioned employees, consultants, and contractors who install their own wireless stations and APs without regard to proper security configuration requirements can pose a threat to the enterprise. For example, many wireless ready laptops through default configuration permit ad-hoc wireless connections. These connections can readily be hacked at hotspots and other public access networks. Further, the devices connecting to WLANs are mobile and thereby introduce increased exposure to the internal network. For example, wireless devices can come and go in the enterprise, and can be located anywhere within a wireless footprint of the WLAN.

Wireless intrusion protection systems (WIPS) have been developed to monitor and secure wireless networks by identifying rogue wireless networks, detect intruders and impending threats, and enforce wireless network security policies. WIPS can include one or more servers connected through wired or wireless connections to multiple sensors (also known as sniffers) or APs. WIPS can use dedicated sensors or APs to detect attacks/events, performance degradation, and policy compliance. Sensors and APs therefore can be located throughout the wireless network infrastructure to attain coverage for the wireless network activity. Even with multiple sensors and APs, there still may be problems covering all the airwaves because sensors and APs often include single or dual-band radios which scan a single channel at a time. Further, wireless networks may operate in the 2.4 GHz and 5 GHz frequency bands, thereby incorporating 34 authorized channels.

Wireless networks can include multiple wireless clients (e.g., WLAN cards connected to a computer). There may be one to two orders of magnitude more wireless clients in a wireless network than sensors and APs. Wireless clients communicate to the wireless network when the computer has data to transmit or receive. The wireless device in a computer may be idle (e.g., not transmitting or receiving data) for a significant amount of time.

Some commercially available systems attempt to utilize processor idle time. Such systems include, for example, SETI@Home (University of California, Berkeley, Calif., available at http://setiathome.berkeley.edu/). SETI@Home is a computer program configured to operate when a processor is idle or in screen saver mode. The SETI@Home program is configured to connect to a server to receive Search for Extraterrestrial Intelligence (SETI) data, to analyze the data on the processor while the computer is idle, and to send the results back to a server when complete and there is a connection.

The present disclosure provides distributed monitoring of a wireless network using a plurality of wireless client devices in communication with the wireless network.

A method for distributed monitoring a wireless network with a plurality of wireless client devices in communication with the wireless network includes the steps of: directing one or more of a plurality of wireless client devices in communication with a wireless network to monitor the wireless network and collect data corresponding to wireless traffic on the wireless network at a predetermined range of frequencies, and to store the data for analysis; receiving collected data from the plurality of wireless client devices at one or more servers, the servers being configured to accumulate the collected data; storing the received data for analysis; and, analyzing the stored data received from the plurality of wireless client devices so as to identify traffic corresponding to anomalous wireless activity.

A processor based method for monitoring a wireless network using a client equipped with a wireless device includes the steps of: receiving wireless data from the wireless network at a wireless device responsive to an activation condition, the wireless data including wireless traffic transmitted to any receiver, wherein the wireless data is transmitted within a receiver range of the wireless device; analyzing the data to identify relevant data, events, and statistics, wherein the data, events, and statistics being relevant to a security profile associated with the wireless network; logging the relevant data, events, and statistics to a log file located on a local data store; and, sending the log file to a server responsive to the wireless device having an available connection to the server.

A computer system having an intrusion protection system agent includes: a wireless communication interface operable to receive and transmit data on a wireless network; a data store operable to store a log file associated with analysis of the wireless network; and a system processor including one or more processing elements, wherein the system processor is in communication with the system data store and the wireless communication interface and wherein the system processor is programmed or adapted to: access the wireless communication interface to collect wireless data responsive to an activation condition, the wireless data being collected without consideration for the intended recipient of the data; store the collected wireless data in the data store; perform an analysis of the collected wireless data to identify relevant data, events, and statistics, wherein the identified data, events, and statistics are relevant based upon a security profile associated with the wireless network; store a log file associated with the analysis of the collected wireless data; and, alert a centralized server via a network connection based upon the analysis of the information.

BRIEF DESCRIPTION OF THE DRAWINGS

FIGS. 1A-1D depict a Wireless Local Area Network (WLAN) and a wireless intrusion protection system (WIPS).

DETAILED DESCRIPTION

Figure 1B:
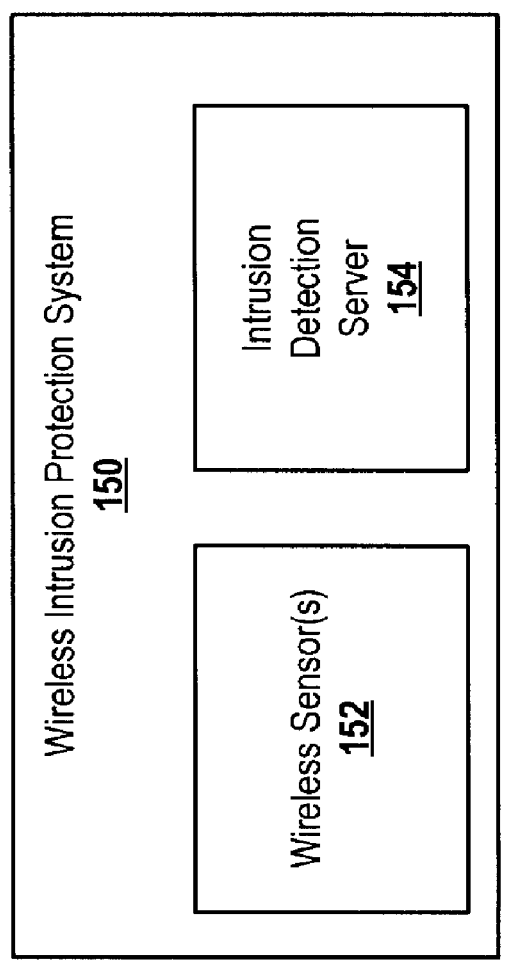

FIG. 1A depicts a wireless network 100 and a wireless intrusion protection system (WIPS) 101. The wireless network 100 includes three wireless access points (APs) 115. Each AP 115 includes a wireless radio configured to transmit and receive wireless data with a coverage area 140. In this example, the APs 115 connect to the Local Area Network (LAN) through a network 105, which can be, for example an internet protocol (IP) network. In an example embodiment, the network 105 may include an ethernet network. Additionally, the APs 115 may connect to other APs 115 through a wireless connection (not shown). Adjacent APs 115 sometimes operate on non-overlapping wireless channels (e.g., wireless frequencies) to minimize interference.

The wireless network 100 is monitored by a WIPS 101 which includes a wireless sensor 110 and an intrusion detection server 130. It should be understood that in various examples, the wireless sensor 110 can be a sniffer. In this example, the sensor 110 is located at a physical location covering the wireless coverage areas 140 of the three APs 115. The sensor 110 can include a wireless radio configured to transmit and receive wireless data. The sensor 110 can also connect to the LAN via the IP network 105. The sensor 110 can be configured to monitor the wireless network and to communicate to the intrusion detection server 130. The sensor 110 can monitor one to two wireless channels at a time, depending on the number of wireless radios included with the sensor 110. Additionally, APs 115 may also operate as sensors 110 and communicate to the intrusion detection server 130. In some wireless network deployments with a WIPS 101, multiple sensors 110 are located throughout the wireless network coverage areas.

The wireless network 100 can include multiple clients 120. The clients 120 can be configured with a wireless device for communication with the APs 115. Additionally, the wireless devices may be used for ad-hoc connections to other clients 120 (not shown). The clients 120 may include desktop computers, notebook computers, storage devices, printers, and any other system equipped with a wireless device. Client 120 wireless devices can include wireless radios configured to communicate over the wireless network 100. The wireless radios are used to transmit and receive data between the wireless network and the client 120. Clients 120 use the wireless radios while communicating over the wireless network. For example, the client 120 might not use its wireless radio when the client 120 is idle (e.g., in screen-saver mode or not transmitting/receiving data from the wireless network 100).

FIG. 1B depicts a block diagram of a wireless intrusion protection system (WIPS) 150 as in known in the art. The WIPS 150 includes one or more sensors 152 and one or more intrusion detection servers 154. The sensor(s) 152 can be located throughout the wireless network environment. There can be one to two orders of magnitude more APs and clients in a wireless network than sensors 152. The sensor(s) 152 can monitor and analyze the data on the wireless network to collect data, statistics, and events. The sensor(s) 152 communicate with the intrusion detection server(s) 154 to send the collected data, statistics, and events. In one example, the sensor(s) 152 use secure socket link (SSL) to communicate with the intrusion detection server(s) 154. The intrusion detection server(s) 154 can aggregate and correlate the data, statistics, and events received from the sensor(s) 152. This aggregation and correlation allows the intrusion detection server(s) 154 to minimize false positive readings, to verify events and attacks, and to minimize the alarms generated for each event. Based on the aggregation and correlation, the intrusion detection server(s) 154 can detect attacks or events, performance degradation, and policy compliance of the wireless network. Existing WIPS 150 use sensor(s) 152 to monitor the wireless network. Additionally, the WIPS 150 can also use wireless access points (APs) as sensors occasionally to gather statistics and events while the APs are not actively receiving communications (not shown).

Figure 1D:
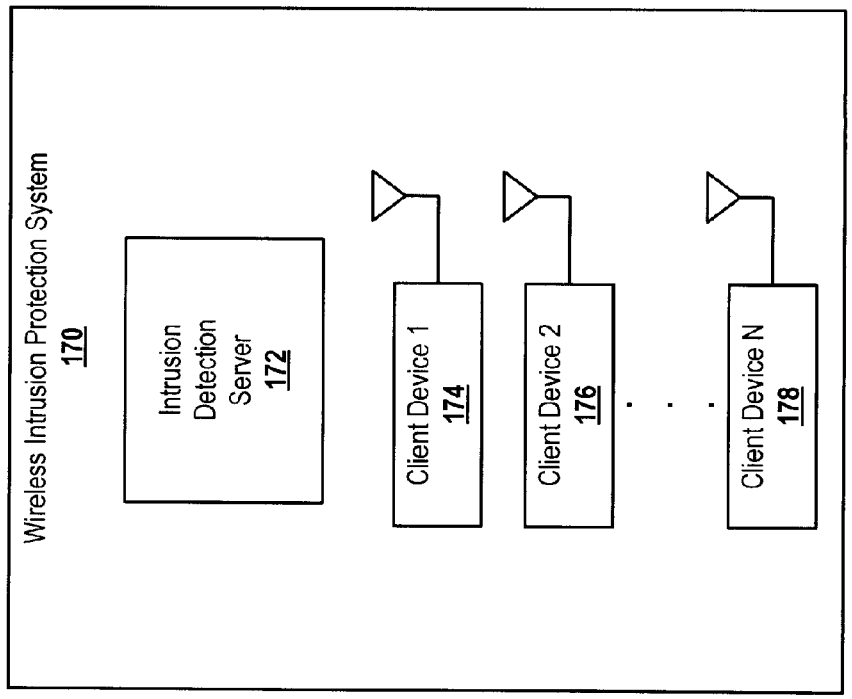
Figure 1C:
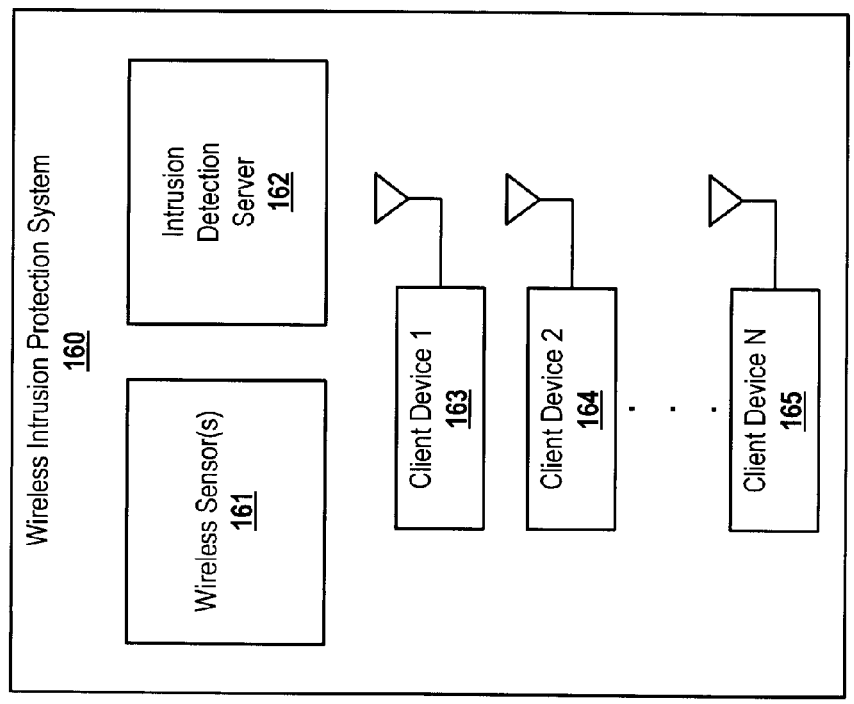

FIG. 1C depicts a block diagram of a wireless intrusion protection system (WIPS) 160 using distributed collaborative intelligence of clients 163, 164, 165 and sensors 161, according to the present disclosure. The WIPS 160 includes one or more dedicated sensors 161, one or more intrusion detection servers 162, and multiple clients 163, 164, 165. The intrusion detection server(s) 162 communicate with the clients 163-165 distributed throughout the wireless network utilizing them occasionally as sensors 161 in addition to the dedicated sensor(s) 161. The clients 163-165 are configured with software to monitor the wireless network at predetermined times (e.g., when the respective client radios and/or processors are idle), to log the received data and statistics, and to communicate the results to the intrusion detection server(s) 162 periodically. The intrusion detection servers 162 analyze all the data from the clients 163-165 and the sensor(s) 161 to detect attacks or event, performance degradation, and policy compliance of the wireless network.

FIG. 1D depicts a block diagram of a wireless intrusion protection system (WIPS) 170 using distributed collaborative intelligence of clients 174, 176, 178. The WIPS 170 includes one or more intrusion detection servers 172 and multiple clients 174, 176, 178 distributed throughout the wireless network. In one example, the WIPS 170 does not use sensors to monitor the wireless network, and instead uses clients 174, 176, 178 to monitor the wireless network.

Figure 2A:
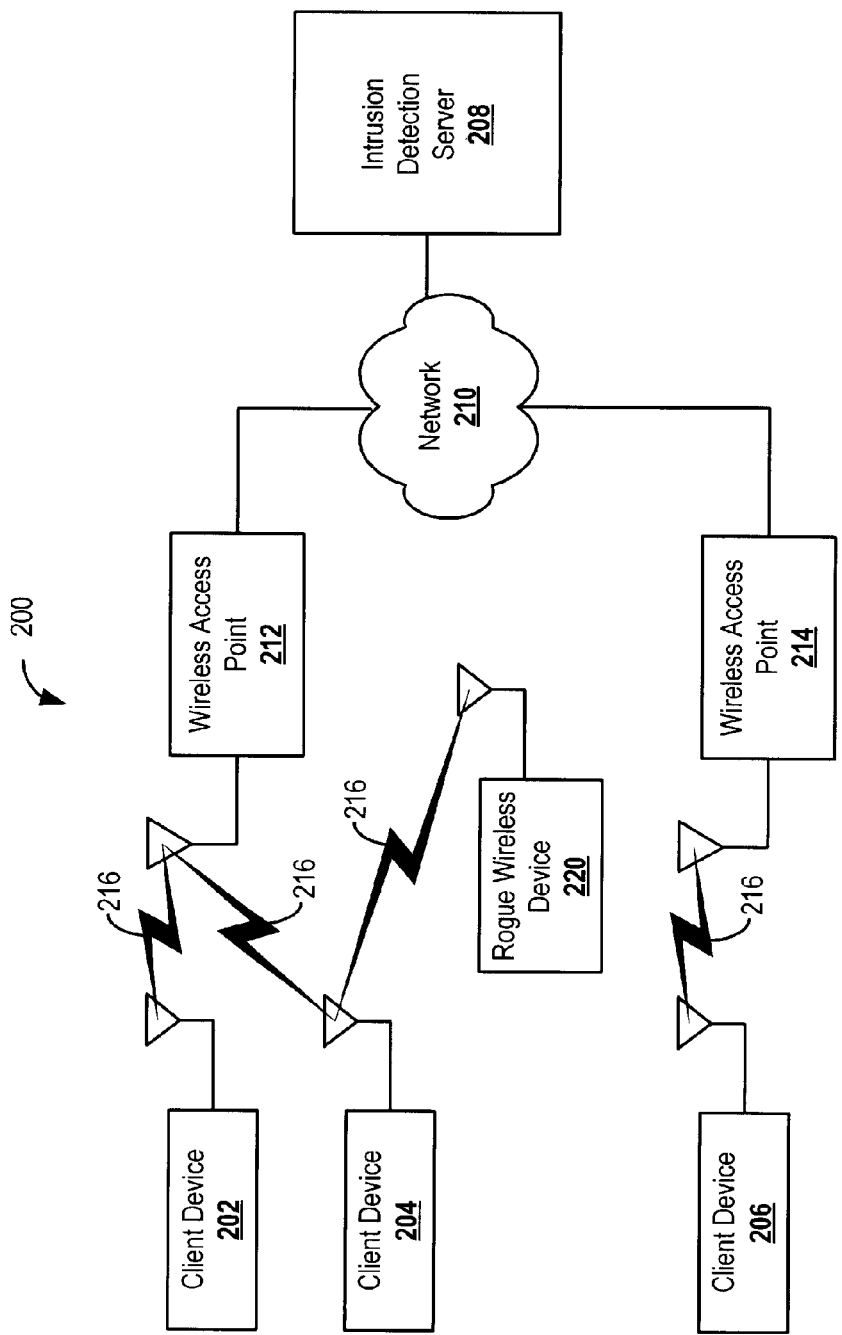
FIGS. 2A-2D depict a wireless network with a wireless intrusion protection system (WIPS) utilizing distributed clients for monitoring.

FIG. 2A depicts a wireless network having wireless intrusion protection systems (WIPS) 200 that utilize distributed clients 202, 204, 206 for monitoring. One or more intrusion detection servers 208 communicate with the distributed clients 202-206 through a wired network 210. The network 210 may connect to wireless access points (APs) 212, 214. The distributed clients 202-206 may be equipped with intrusion protection system (IPS) agents, which are software programs configured to monitor the wireless network through the client 202-206. The IPS agent directs the client 202-206 to periodically monitor the wireless network, to log the received data and statistics, and to communicate the log back to the intrusion detection server(s) 208.

Figure 2B:
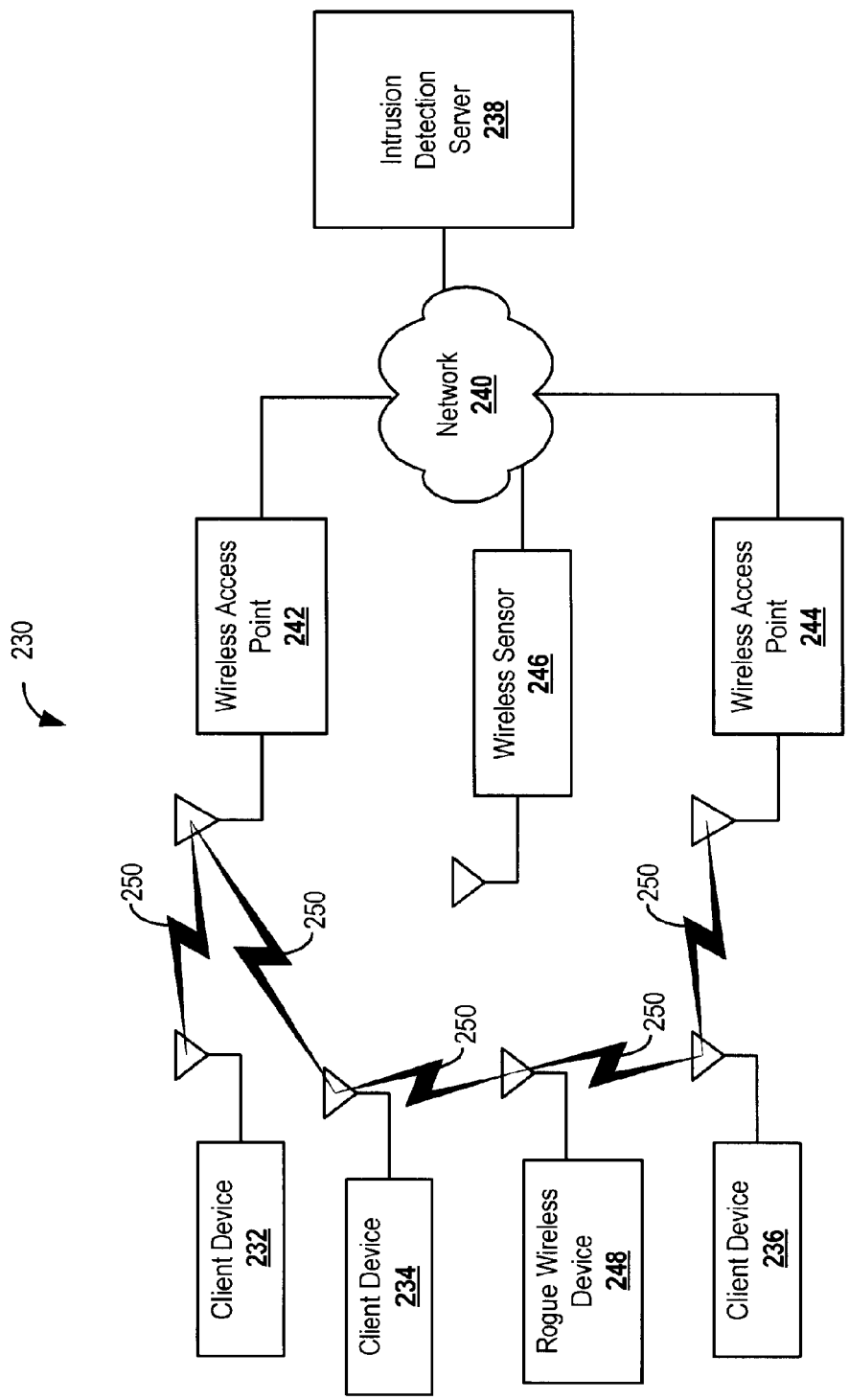

FIG. 2B depicts a wireless network having wireless intrusion protection systems (WIPS) 230 that utilize distributed clients 232, 234, 236 for monitoring. One or more intrusion detection servers 238 communicate with the distributed clients 232-236 through a wired network 240. The network 238 may connect to wireless access points (APs) 242, 244 or to one or more sensors 246. The distributed clients 232-236 have intrusion protection system (IPS) agents, which are software programs configured to monitor the wireless network through the client 232-236. The IPS agent directs the client 232-236 to periodically monitor the wireless network, to log the received data and statistics, and to communicate the log back to the intrusion detection server(s) 238.

Figure 2C:
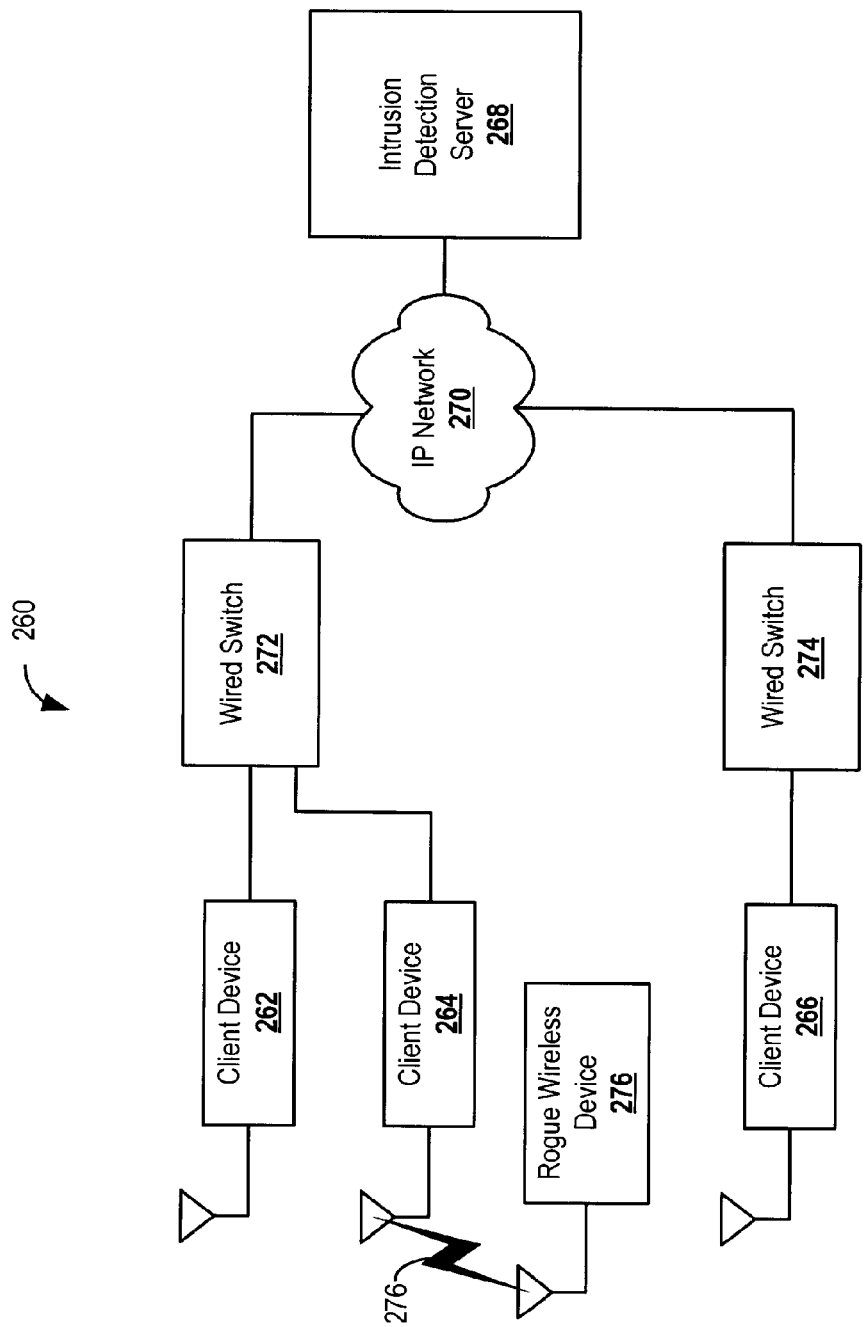

FIG. 2C depicts a wireless network having wireless intrusion protection systems (WIPS) 260 that utilize distributed clients 262, 264, 266 for monitoring. One or more intrusion detection servers 268 communicate with the distributed clients 262-266 through a wired network 270. The network 270 may connect to wired switches 272, 274. The distributed clients 262-266 have intrusion protection system (IPS) agents, which are software programs configured to monitor the wireless network through the client 262-266. The IPS agent directs the client 262-266 to periodically monitor the wireless network, to log the received data and statistics, and to communicate the log back to the intrusion detection server(s) 268.

Figure 2D:
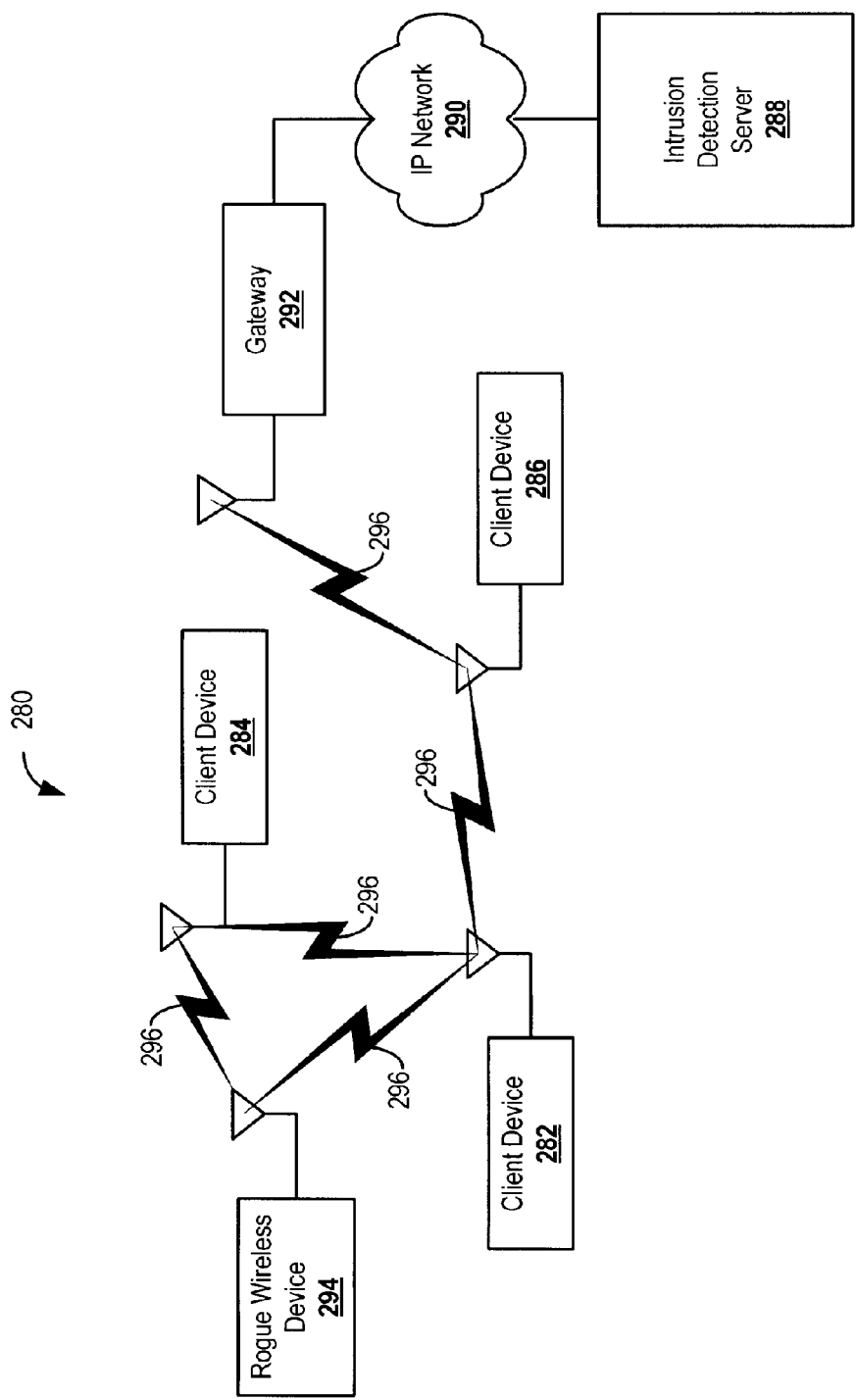

FIG. 2D depicts a wireless network having wireless intrusion protection systems (WIPS) 280 that utilize distributed clients 282, 284, 286 for monitoring. One or more intrusion detection servers 288 communicate with the distributed clients 282-286 through a wired network 290. The network 290 may connect to a gateway 292. The distributed clients 282-286 have intrusion protection system (IPS) agents, which are software programs configured to monitor the wireless network through the client 282-286. The IPS agent directs the client 282-286 to periodically monitor the wireless network, to log the received data and statistics, and to communicate the log back to the intrusion detection server(s) 288.

In FIGS. 2A-2B, the distributed clients 202-206, 232-236 communicate to wireless APs 212, 214, 242, 244 over wireless connections 216, 250. The APs 212, 214, 242, 244 communicate with the network 210, 240, respectively. In one example the network 210, 240 may include an ethernet connection.

In FIG. 2A, there are no sensors and the monitoring is done by the distributed clients 202-206 as depicted in FIG. 1D. There is a rogue wireless device 220 which may attempt to access or perform an attack on the wireless network. The distributed clients 202-206 periodically monitor the wireless network when the clients 202-206 are not using their wireless device. The clients 202-206 periodically provide the intrusion detection server 208 their monitored data, and can detect the rogue wireless device 220 through wireless connections 216. The intrusion detection server 208 can correlate events and statistics from the distributed clients 202-206. In this example, the rogue wireless device 220 is detected by one client 204 through the wireless connection 201. The intrusion detection server 208 will discover the rogue wireless device 220 by correlating the data received from the client 204. Additionally, the intrusion detection server 208 may direct one or more clients 202-206 to terminate the rogue wireless device 220 using existing WIPS termination methods.

FIG. 2B adds a wireless sensor 246 the wireless network. In this example, the rogue wireless device 248 is detected by two clients 234, 236 through wireless connections 250. The distributed clients 232-236 may be used in conjunction with wireless sensor(s) 246 for monitoring the wireless network as depicted in FIG. 1C.

In FIG. 2C, the distributed clients 262-266 are connected to wired switches 272, 274. The intrusion detection server 268 communicates with the distributed clients 262-266 through wired connections such as an ethernet LAN or dialup connection. The network, in the example of FIG. 2C, includes no wireless APs or wireless sensors, and utilizes the distributed clients 262-266 to monitor the wireless network. The rogue wireless device 276 is detected by the client 264 through the wireless connection 276. The intrusion detection server 268 may enforce wireless policies by using the distributed clients 262-266 to monitor wireless communications. For example, there may be a no-wireless policy for security reasons where no wireless network communications are allowed by the policy. Here, the intrusion detection server 268 may be configured to generate an alarm whenever a wireless device is monitored and to perform active defense and/or termination techniques such as transmitting an error signal or generating a honeypot trap. Additionally, this example shows an intrusion detection server 268 may communicate to distributed clients 262-266 through wired connection as well as wireless connections.

In FIG. 2D, the distributed clients 282-286 communicate with ad-hoc wireless connections to a gateway 292 which is connected to the network 290. Ad-hoc wireless connections allow a client 282-286 to connect to another client 282-286 directly over a wireless connection 296. Ad-hoc wireless connections are often used where there is no wireless network infrastructure. The gateway 292 communicates to the intrusion detection server 288 as well as the distributed clients 282-286. In this example, the rogue wireless device 294 is detected by two clients 282, 284 while attempting to connect through an ad-hoc wireless connection 296. In another embodiment, a standalone ad hoc wireless network may exist with no external access such as removing the gateway 292 from FIG. 2D. In this example, the distributed clients 282-286 may continue to monitor the wireless network and to log the data locally until there is a connection to the intrusion detection server 288.

Figure 3:
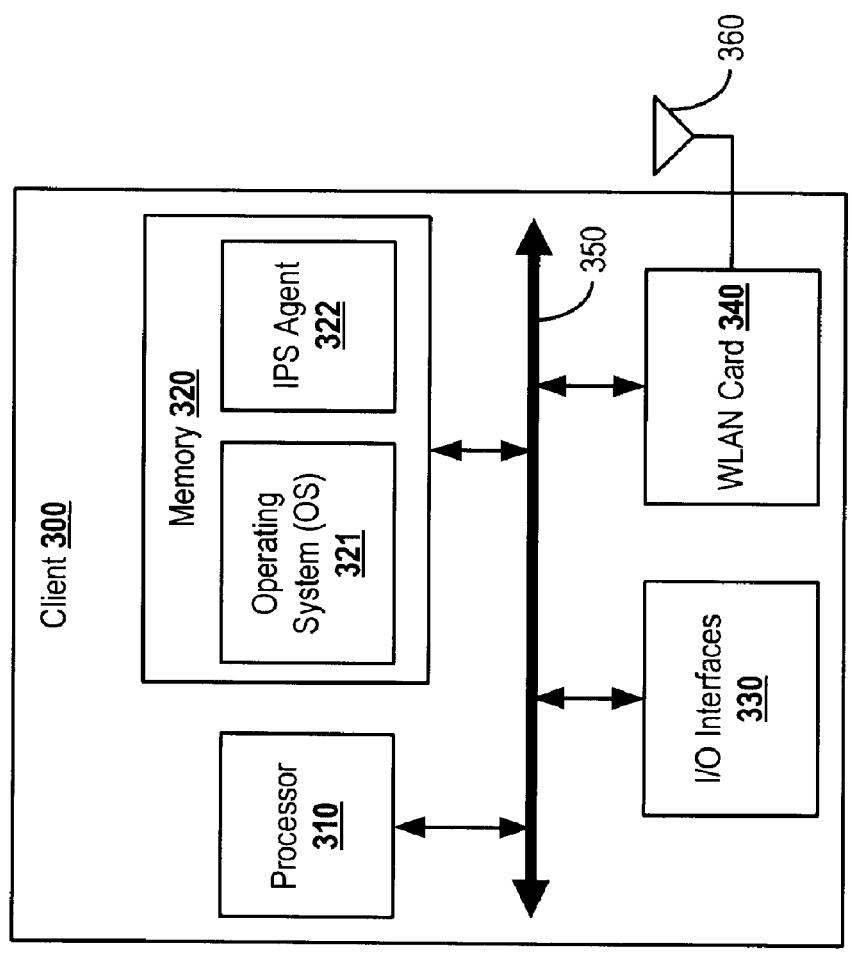
FIG. 3 is a block diagram depicting a client according to the present disclosure.

FIG. 3 is a block diagram depicting a client 300 having an intrusion protection agent. The client 300 may be a digital computer that, in terms of hardware architecture, generally includes a processor 310, memory system 320, input/output (I/O) interfaces 330, and WLAN card 340. These components (310, 320, 330, and 340) are communicatively coupled via a local interface 350. The local interface 350 can be, for example but not limited to, one or more buses or other wired or wireless connections, as is known in the art. The local interface 350 may have additional elements, which are omitted for simplicity, such as controllers, buffers (caches), drivers, repeaters, and receivers, among many others, to enable communications. Further, the local interface 350 may include address, control, and/or data connections to enable appropriate communications among the aforementioned components.

The processor 310 is a hardware device for executing software instructions. The processor 310 can be any custom made or commercially available processor, a central processing unit (CPU), an auxiliary processor among several processors associated with the client 300, a semiconductor-based microprocessor (in the form of a microchip or chip set), or generally any device for executing software instructions. When the client 300 is in operation, the processor 310 is configured to execute software stored within the memory 320, to communicate data to and from the memory 320, and to generally control operations of the client 300 pursuant to the software instructions.

The I/O interfaces 330 may be used to receive user input from and/or for providing system output to one or more devices or components. User input may be provided via, for example, a keyboard and/or a mouse. System output may be provided via a display device and a printer (not shown). I/O interfaces 330 may include, for example, a serial port, a parallel port, a small computer system interface (SCSI), an infrared (IR) interface, a radio frequency (RF) interface, and/or a universal serial bus (USB) interface.

The WLAN card 340 may be used for communication with a Wireless Local Area Network (WLAN). Additionally, the WLAN card 340 may be configured in an ad-hoc mode whereby the WLAN card 340 is configured to connect to another client (not shown). The WLAN card 340 includes a wireless radio 360 which is configured to communicate wirelessly over a WLAN. The WLAN card 340 can be configured to communicate using one of the IEEE 802.11 protocols such as 802.11a/b/g. The WLAN card 340 may include address, control, and/or data connections to enable appropriate communications on the WLAN.

The memory 320 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 320 may incorporate electronic, magnetic, optical, and/or other types of storage media. Note that the memory 320 can have a distributed architecture, where various components are situated remotely from one another, but can be accessed by the processor 310.

The software in memory 320 may include one or more software programs, each of which includes an ordered listing of executable instructions for implementing logical functions. In the example of FIG. 3, the software in the memory system 320 includes an intrusion protection system (IPS) agent 322 and a suitable operating system (O/S) 321. The operating system 321 essentially controls the execution of other computer programs, such as an IPS agent 322, and provides scheduling, input-output control, file and data management, memory management, and communication control and related services. The operating system 321 may be any of WINDOWS/NT, WINDOWS 2000, WINDOWS/XP Server WINDOWS MOBILE (all available from Microsoft, Corp. of Redmond, Wash.), Solaris (available from Sun Microsystems, Inc. of Palo Alto, Calif.), or LINUX (or another UNIX variant) (such as available from RedHat of Raleigh, N.C.).

The IPS agent 322 is a software program loaded in the memory 320 of the client 300 to enable monitoring of the wireless network. The IPS agent 322 is configured to run on the client 300 in the background, and to become active based upon predetermined or programmed conditions such as when the client 300 is idle. When active, the IPS agent 322 is configured to: 1) communicate with the WLAN card 340; 2) store received data in the memory 320; and 3) communicate with one or more intrusion detection servers. The intrusion detection server(s) may direct the IPS agent 322 to scan a particular wireless channel. Additionally, a user may preset the particular channel to monitor. The IPS agent 322 can be programmed in some examples to communicate with the WLAN card 340 when the WLAN card 340 or the client 300 is idle. The IPS agent 322 receives data from the WLAN and stores the data in the memory 320.

In some examples, the IPS agent 322 can include configurable parameters to allow a user to determine when it is active. For instance, the user may set the IPS agent 322 to operate when the client 300 is inactive for a predetermined time period. Alternatively, a system administrator may set the IPS agent 322 to operate whenever a client 120 is not communicating to the WLAN. The IPS agent 322 may be loaded on a client 300 via a CDROM, over a network connection, or preloaded when the operating system 321 is installed. The IPS agent 322 may be configured to operate on a variety of clients 300 including an Intel-compatible processor platforms, such as those using at least one Pentium III or Celeron (Intel Corp., Santa Clara, Calif.) class processor; processors such as UltraSPARC (Sun Microsystems, Palo Alto, Calif.) could be used in other embodiments.

Figure 4:
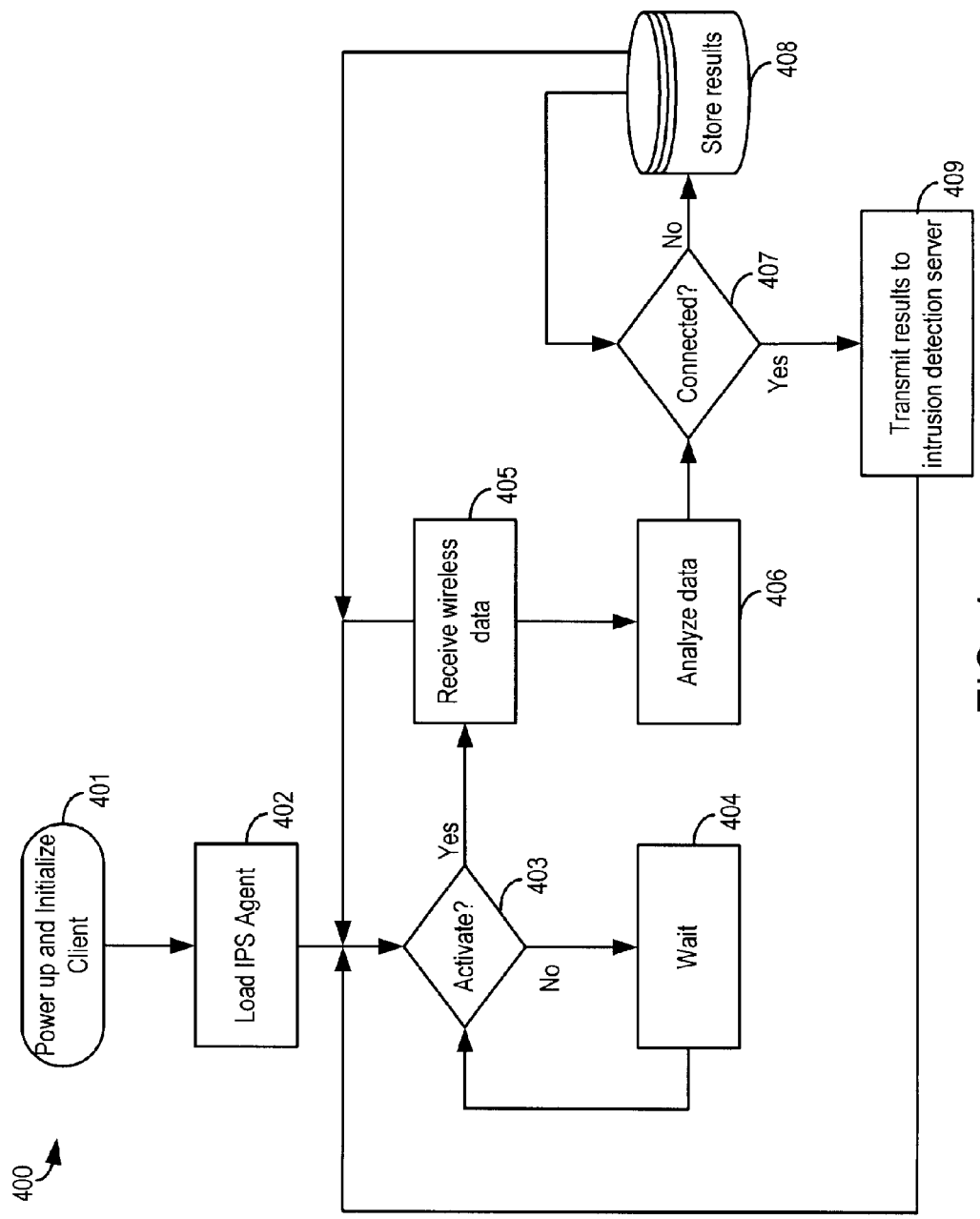
FIG. 4 is a flowchart illustrating an operational scenario for an intrusion protection system (IPS) agent operating on a client.

FIG. 4 is a flowchart illustrating an operational scenario 400 of an intrusion protection system (IPS) agent operating on a client. The client may include a laptop computer, a desktop computer, a server, a workstation, or any other computing device. IPS agents can be installed on multiple clients, thereby operating to provide distributed collaboration in monitoring a wireless network. The IPS agent is installed on the client through a CDROM, network file server, or other means to distribute software.

The scenario 400 starts with the power-up and initialization of the client, as depicted in step 401. The IPS agent is loaded, as depicted in step 402. The IPS agent may be configured to load as the client initializes (e.g., on startup) or it may be loaded manually by a user. The IPS agent is loaded into memory as shown in FIG. 3. The operational scenario 400 determines whether the IPS agent should be activated as depicted in step 403. The operational scenario 400 may be configured to activate wireless monitoring when the client is idle (e.g., screensaver mode), when the WLAN card in the client is idle, or at predetermined intervals. If the IPS agent is not activated, the IPS agent waits, as depicted in step 404.

If the IPS agent is activated, then the IPS agent directs the client to receive wireless data from the WLAN card, as depicted in step 405. The IPS agent may be configured to scan a particular wireless channel based upon a preset configuration or based on direction from the intrusion detection server. Additionally, the IPS agent may be configured to receive all wireless data from a channel or particular frames only based a preset configuration or based on direction from the intrusion detection server. In some examples, the operational scenario 400 can determine whether a condition exists to deactivate by simultaneously performing step 403 and step 405.

The IPS agent analyzes the data, as depicted in step 406. The IPS agent uses the client processor to analyze the data, to collect statistics of the wireless network, and to process relevant frames. Upon analyzing the data, the IPS agent may store a copy of the results in memory. The IPS agent directs the client to check connectivity to the intrusion detection server, as depicted in step 407. If there is no connectivity, the IPS agent stores a copy of the results in memory, as depicted in step 408. The IPS agent periodically checks connectivity to determine whether the wireless data can be transmitted to an intrusion detection system. If connectivity exists, the IPS agent transmits the results to the intrusion detection system, as depicted in step 409. In steps 408 and 409, the operational scenario 400 returns to step 403 to determine whether to deactivate the IPS agent.

Figure 5:
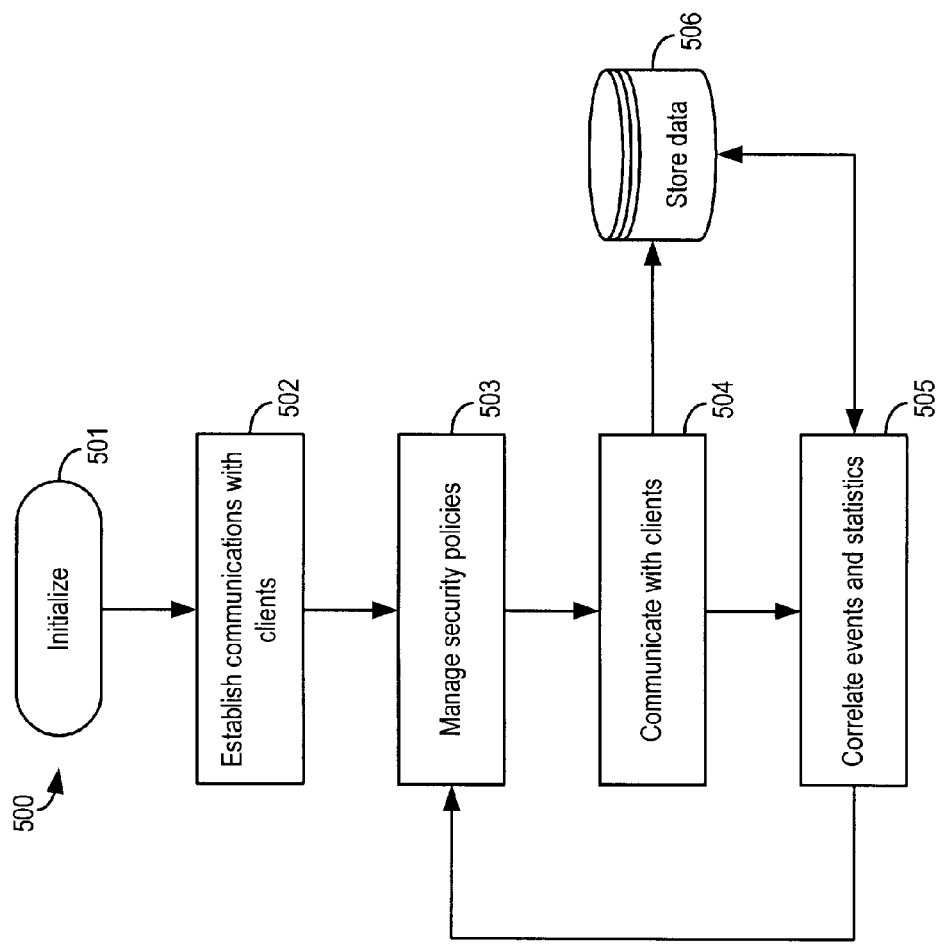
FIG. 5 is a flowchart illustrating an operational scenario of an intrusion detection server communicating with multiple clients operating the IPS agent.

FIG. 5 is a flowchart illustrating an operational scenario 500 of an intrusion detection server communicating with multiple clients executing the IPS agent software. In some example systems and methods, the intrusion detection server may be one or more server devices. The intrusion detection server is a component of the WIPS and provides centralized monitoring, correlation of attacks and events, analysis of performance degradations, and enforcement of security policies. Existing intrusion detection servers communicate with wireless sensors. The operational scenario 500 illustrates a method of communicating with clients operating the IPS agent software.

The intrusion detection server is initialized, as depicted in step 501. In the case of multiple servers, the servers can configured to communicate with the other servers or can be configured to be stand-alone entities. In step 502, the intrusion detection server establishes communication with clients operating the IPS agent software. The intrusion detection server tracks the clients and the channels that client is monitoring.

The intrusion detection server(s) can manage security policies, as depicted in step 503. Here, the intrusion detection server can determine what action to take, if any. These actions may include such actions as directing clients to monitor particular channels at particular times, directing clients to terminate a rogue device, providing notification of policy violations, attacks, events, and performance degradations, among many others.

The intrusion detection server can communicate with the clients, as depicted by step 504. The intrusion detection server can communicate the results from managing the security policies in step 503. This management of security policies can include providing updates on channel and time scan patterns. Additionally, the intrusion detection server can receive wireless data and statistics from clients in step 504. The data and statistics received from clients are stored in memory, as depicted in step 506. The memory may include local memory such as a system data store or other storage attached to the intrusion detection server. It should be understood that the memory can include network file storage.

The intrusion detection server correlates events and statistics, as depicted in step 505. The intrusion detection server can utilize several detection technologies such as anomalous behavior, stateful protocol analysis and signature matching. Additionally, the intrusion detection server can include a sophisticated correlation engine that is programmed to analyze data across different clients to minimize false positives. The intrusion detection server accesses and stores data in local or network file storage, as depicted in step 506. Based on the results of step 505, the intrusion detection server can manage security policies, as depicted in step 503.

Figure 6:
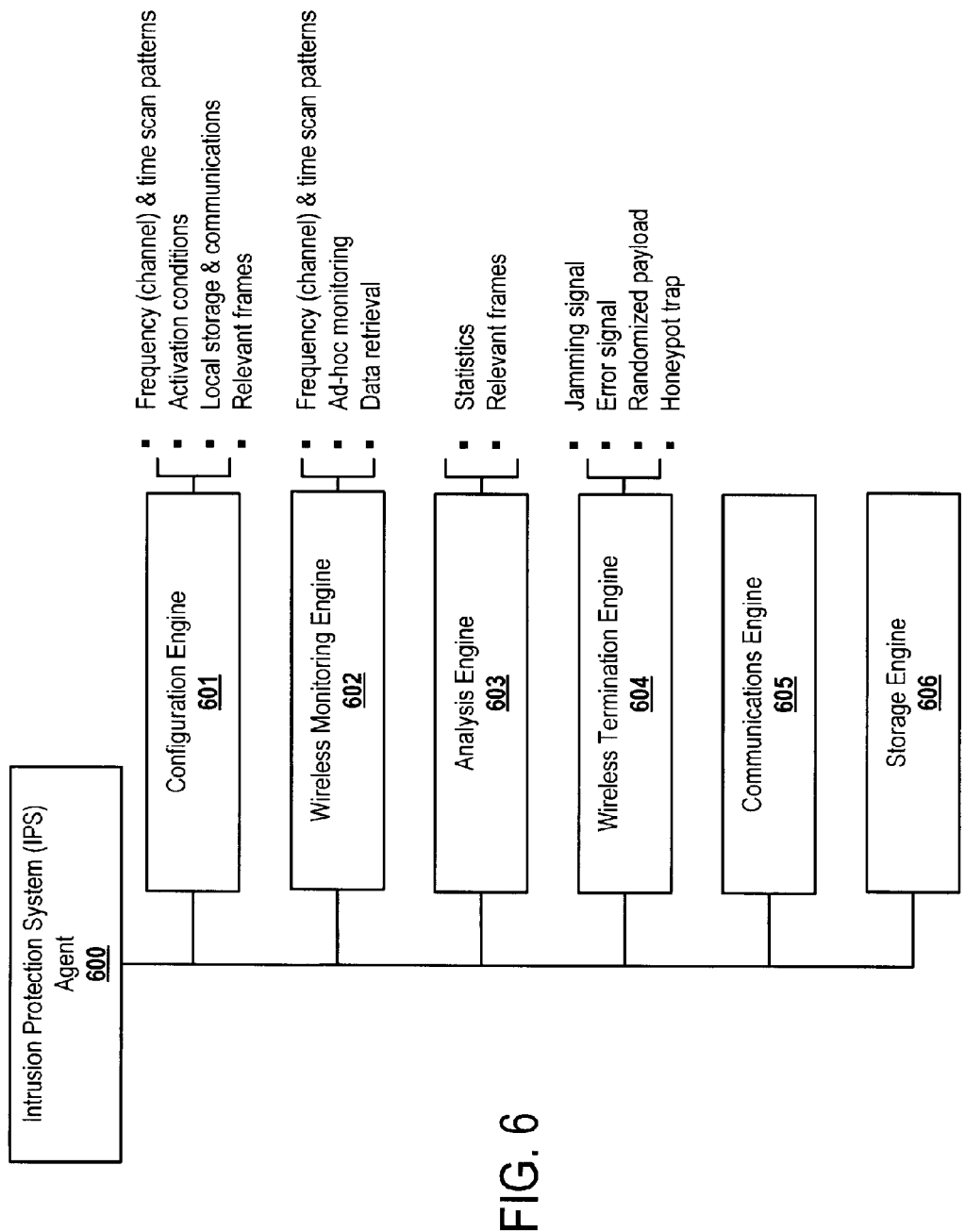
FIG. 6 illustrates examples of the functions of the intrusion protection system (IPS) agent of the present disclosure.

FIG. 6 illustrates examples of the functions of an intrusion protection system (IPS) agent 600. IPS agents 600 can include configuration engines 601. The configuration engine 601 provides a way to set the operational parameters of the IPS agent 600 including, among others: setting the frequency (e.g., wireless channel) and time scan patterns, setting the activation conditions of the IPS agent 600, setting configuration parameters such as local storage location and communications settings, and relevant frame guidelines. Activation conditions determine when the IPS agent 600 is active on the client and it may include, for example, when the client is idle or at predetermined time intervals. The relevant frame guidelines instruct the analysis engine 603 on which frames to store and forward to the intrusion detection server. These guidelines may be based on historical events or current conditions and may include, for example, specific MAC addresses or specific frames which represent known attacks or intrusion. The configuration engine 601 may be accessed locally or remotely by a user or a system administrator. Additionally, the configuration engine 601 may prevent access by the user as determined by the system administrator. Further, the configuration engine 601 may be updated remotely by the intrusion detection server as conditions occur to allow the IPS agent 322 to adapt to the changing environment of the wireless network.

The IPS agent 322 includes a wireless monitoring engine 602. The wireless monitoring engine 602 provides means to control communications of the WLAN card in the client including: setting the frequency (e.g., wireless channel) and time scan patterns on the WLAN card, setting ad-hoc channel monitoring on the WLAN card, and transmitting and receiving data between the WLAN card and the IPS agent 600. The wireless monitoring engine 602 is active according to the activation conditions in the configuration engine 601.

The IPS agent 600 includes an analysis engine 603. The analysis engine 603 receives and processes the data from the wireless monitoring engine 602. The analysis engine 603 operates on the client, and performs initial analysis of the received wireless data prior to forwarding it to the intrusion detection server. The analysis engine 603 compiles statistics regarding the wireless network and stores relevant frames. The relevant frames may include rogue devices or attack related frames and the analysis engine 603 is set to store these according to the parameters set in the configuration engine 601 and the communications from the intrusion detection server.

The IPS agent 600 includes a wireless termination engine 604. The wireless termination engine 604 is configured to provide proactive protection in the wireless network by using the client to thwart attacks on the network. The wireless termination engine 604 may be enabled through communications with the intrusion detection server where the intrusion detection server utilizes the client closest to an attacker (e.g., rogue wireless device or rogue AP) to thwart the attack through one of several air termination mechanisms existing in WIPS systems. The triggered active defense may include: transmitting a jamming signal, transmitting a signal to introduce errors, transmitting a signal to increase the difficulty associated with breaking the network encryption (e.g., typically by including in the signal packet appearing legitimate but containing randomized payloads), or setting up a honeypot trap on the client to lure an attacker. Systems and methods used to perform active defense methods are described in detail by U.S. patent application Ser. No. 10/161,443 entitled "METHOD AND SYSTEM FOR ACTIVELY DEFENDING A WIRELESS LAN AGAINST ATTACKS" filed Jun. 3, 2002, which has been incorporated by reference.

The IPS agent 600 includes a communications engine 605. The communications engine 604 provides means for the IPS agent 600 to communicate with the intrusion detection server. The communications engine 605 may communicate through the WLAN card or through another network connection (e.g., ethernet or dial-up). The communications engine 605 operates according to the parameters set in the configuration engine 601 including when to communicate with the intrusion detection server, retry communication attempts, and mode of communication. The communications engine 605 provides the intrusion detection server the data and statistics and receives updates from the intrusion detection server.

The IPS agent 600 includes a storage engine 606. The storage engine 606 provides local data storage for the IPS agent 600. The storage engine 606 may include the existing memory in the client such as a hard disk drive or resident RAM memory. The storage engine 606 communicates and stores data associated with the configuration engine 601, the wireless monitoring engine 602, the analysis engine 603, the wireless termination engine 604, and the communications engine 605.

Client based distributed sensing agents can provide better spatial, temporal and frequency level visibility because of sheer numbers in addition to improved location tracking and air termination capabilities. Moreover, distributed sensing agents installed on wireless clients can lower the cost of deploying a wireless intrusion protection system, for example, by reducing the number of sensors deployed, or enabling a wireless intrusion protection system to be deployed where no wireless infrastructure (e.g., no APs, sensor, or sniffer devices). Further, in some examples, the sensing agent can operate transparently to the user of a wireless client, because it can operate while the client is idle or inactive, thereby facilitating usage of an unused portion of radio and/or processing power.

As used in the description hereinabove and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context clearly dictates otherwise; the phrase "exclusive or" may be used to indicate situation where only the disjunctive meaning may apply.

Throughout this application, various publications may have been referenced. The disclosures of these publications in their entireties are hereby incorporated by reference into this application in order to more fully describe the state of the art to which this invention pertains.

The embodiments described above are given as illustrative examples only. It will be readily appreciated by those skilled in the art that many deviations may be made from the specific examples disclosed in this specification without departing from the claims. Accordingly, the scope of this disclosure is to be determined by the claims below rather than being limited to the specifically described embodiments above.

What is claimed is:

1. A method for distributed monitoring of a wireless network using a plurality of wireless client devices in communication with the wireless network to gather wireless data from the wireless network, the method comprising the steps of:
    loading a software agent on one or more of a plurality of wireless client devices in communication with a wireless network, wherein the software agent is configured to utilize the one or more of the plurality of wireless devices as distributed monitoring devices in the wireless network, and wherein the plurality of wireless client devices comprise authorized wireless devices on the wireless network comprising any of desktop computers, notebook computers, storage devices, printers, or processor devices equipped with a wireless radio;
    directing the one or more of the plurality of wireless client devices to monitor the wireless network and collect data corresponding to wireless traffic from devices transmitting on the wireless network at a predetermined range of frequencies, and to store the data for analysis, wherein the one or more of the plurality of wireless clients are configured to analyze the stored data locally, and wherein the wireless traffic comprising wireless local area network frames;
    receiving collected analyzed data from the plurality of wireless client devices at one or more servers, the servers being configured to accumulate the collected data;
    storing the received data for analysis and correlation; and
    analyzing the stored data received from the plurality of wireless client devices so as to identify traffic corresponding to anomalous wireless activity;
    wherein the software agent directs the one or more of the plurality of wireless client devices to locally monitor, locally analyze, and transmit the stored data to the one or more servers over the wireless network based upon predetermined or programmed conditions associated with the one or more of the plurality of wireless client devices.

2. The method of claim 1, wherein a wireless client device monitors other devices within range and transmitting on the wireless network responsive to the wireless client device not actively communicating on the wireless network.

3. The method of claim 1, wherein the received data comprises events, statistic, and wireless data.

4. The method of claim 3, wherein the analyzing step comprises aggregation and correlation of events and statistics monitored by the plurality of wireless client devices, thereby eliminating duplicative communications that may have been collected by more than one wireless client device.

5. The method of claim 4, further comprising the step of utilizing wireless intrusion detection techniques to identify events and attacks, identify rogue wireless devices, policy violations, and performance degradations.

6. The method of claim 5, wherein the intrusion detection techniques comprise any of anomalous behavior matching, stateful protocol analysis, and signature matching.

7. The method of claim 5, further comprising sending an updated wireless communication policy to the wireless clients responsive to events and attacks, rogue wireless devices, policy violations and performance degradations as detected via the wireless intrusion detection techniques.

8. The method of claim of claim 5, further comprising the step of directing a wireless client device to at least inhibit an identified rogue wireless device's communications with the wireless network, the wireless client device using an active defense mechanism to at least inhibit communications.

9. The method of claim 8, wherein the active defense used on the rogue wireless device is any of sending a jamming signal transmission, sending an error signal transmission, and introducing a honeypot trap.

10. The method of claim 1, wherein the wireless data collected by the wireless client devices supplements wireless data obtained via sensors or access points.

11. The method of claim 1, wherein the directing step is based upon the location of the one or more wireless devices, such that the one or more of the plurality of wireless client devices are located in an area of poor stationary sensor coverage.

12. The method of claim 1, wherein the one or more wireless client devices are utilized in a wireless intrusion protection system in combination with a plurality of sensors thereby enabling the wireless intrusion protection system to cover a larger range of channels or frequencies relative to only using the plurality of sensors for coverage.

13. The method of claim 1, wherein the method is used to provide wireless intrusion protection for ad-hoc wireless networks.

14. The method of claim 1, further comprising the steps of:
    detecting an intruding wireless device based upon the analysis;
    directing one or more of a plurality of wireless client devices to approximate a location of a intruding wireless device based upon signal strength of the device at the one or more wireless client devices;
    receiving approximate location information from the one or more wireless client devices.

15. The method of claim 1, wherein the plurality of wireless client devices are configured to collect any signals received in a space associated with a wireless network regardless of signal destination, the directing step specifying that the one or more wireless client devices monitor and collect wireless data based upon inactivity of the one or more wireless client devices.

16. The method of claim 1, wherein the wireless client device comprises a wireless network interface configured to operate using one or more of the 802.11 standards.

17. A processor based method for monitoring a wireless network with a client equipped with a wireless device, the method comprising the steps of:
    loading a software agent on the client, wherein the software agent is configured to utilize the client as one of a plurality of distributed monitoring devices in the wireless network, and wherein the client comprises an authorized wireless device on the wireless network comprising any of desktop computers, notebook computers, storage devices, printers, or processor devices equipped with a wireless radio;
    monitoring the client for an activation condition associated with the client and operation of the client on the wireless network;
    receiving wireless data from the wireless network responsive to the activation condition, the wireless data comprising wireless traffic transmitted to any receiver, wherein the wireless data is transmitted within a receiver range of the wireless device, and wherein the wireless data comprising wireless local area network frames transmitted by devices on the wireless network other than the wireless device;

at the client and based on the activation condition, locally analyzing the data to identify relevant data, events, and statistics, the data, events, and statistics being relevant to a security profile associated with the wireless network;

at the client, locally logging the relevant data, events, and statistics to a log file located on a local data store; and sending the log file to a server responsive to the wireless device having an available connection to the server, wherein the server is configured to receive a plurality of log files from a plurality of clients.

18. The method of claim 17, further comprising the step of receiving configuration updates from the server, wherein the configuration updates comprise any of activation conditions, frequency and time scanning patterns, storage and communication settings, and security profile updates.

19. The method of claim 18, wherein the activation condition comprises one of the wireless devices not communicating on the wireless network, the client being idle, or a predetermined time.

20. The method of claim 17, further comprising the step of waiting for an activation condition responsive to receiving a deactivation condition, wherein the deactivation condition comprises any of the wireless device communicating data on the wireless network and the client becoming active.

21. The method of claim 17, wherein the availability of the connection to the server comprises the wireless interface having one of an available wireless network or a wired network to transmit the log file to the server.

22. The method of claim 17, wherein the wireless device comprises a wireless network interface configured to operate using one or more of the 802.11 standards.

23. The method of claim 17, wherein the server is configured to aggregate and correlate information received from a plurality of clients.

24. One or more computer readable media storing instructions that upon execution by a computer cause the computer to monitor the use of a wireless device with respect to communications that are received at a wireless interface associated with the computer, wherein the monitoring of the wireless interface comprises:

receiving wireless data from the wireless network at a wireless device responsive to an activation condition associated with the computer and operation of the computer on the wireless network, the wireless data comprising wireless traffic transmitted to any receiver, wherein the wireless data is transmitted within a receiver range of the wireless device, and wherein the wireless data comprises wireless local area network frames transmitted by devices on the wireless network other than the wireless device;

at the computer, locally analyzing the data to identify relevant data, events, and statistics, wherein the data, events, and statistics are relevant based upon a security profile associated with the wireless network;

at the computer, locally logging the relevant data, events, and statistics to a log file located on a local data store;

sending the log file to a server responsive to the wireless device having an available connection to the server over a secure socket link, wherein the server is configured to analyze and correlate data from a plurality of log files; and without the activation condition, operating the computer over the wireless network;

wherein the computer is configured perform the receiving and locally analyzing based upon predetermined or programmed conditions associated with the computer; and wherein the computer comprises an authorized wireless device on the wireless network comprising any of desktop computers, notebook computers, storage devices, printers, or processor devices equipped with a wireless radio, the computer executing the instructions in background until the predetermined or programmed conditions.

25. A computer system having an intrusion protection system agent, the system comprising:

a wireless communication interface operable to receive and transmit data on a wireless network, wherein the data is included in wireless local area network frames compliant to IEEE 802.11 protocols;

a data store operable to store a log file associated with analysis of the wireless network; and a system processor comprising one or more processing elements, wherein the system processor is in communication with the system data store and the wireless communication interface and wherein the system processor is programmed or adapted to:

access the wireless communication interface to collect wireless data responsive to an activation condition, the wireless data being collected without consideration for the intended recipient of the data;

store the collected wireless data in the data store;

locally perform an analysis of the collected wireless data to identify relevant data, events, and statistics responsive to the activation condition, wherein the identified data, events, and statistics are relevant based upon a security profile associated with the wireless network;

locally store a log file associated with the analysis of the collected wireless data;

alert a centralized server via a network connection comprising a secure socket link based upon the analysis of the information; and without the activation condition, operate over the wireless network;

wherein the wireless data compliant to IEEE 802.11 protocols is stored locally in the data store, analyzed locally by the processor is in communication with the system data store, and the log file is created and stored locally in the data store based on the analysis, and wherein the centralized server is configured to analyze and correlate data from a plurality of log files from a plurality of computer systems;

wherein the computer system comprises an authorized wireless device on the wireless network comprising any of desktop computers, notebook computers, storage devices, printers, or processor devices equipped with a wireless radio, the computer system executing the intrusion protection system agent in background until the activation condition.

26. The computer system of claim 25, wherein the centralized server is configured to perform intrusion detection analysis on the wireless network by analyzing information provided by a plurality of computer systems.

* * * * *